United States Patent
Harbers et al.

(10) Patent No.: US 6,648,486 B2
(45) Date of Patent: Nov. 18, 2003

(54) ILLUMINATION SYSTEM AND DISPLAY DEVICE

(75) Inventors: Gerard Harbers, Best (NL); Christoph Gerard August Hoelen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/837,938

(22) Filed: Apr. 19, 2001

(65) Prior Publication Data

US 2001/0038532 A1 Nov. 8, 2001

(30) Foreign Application Priority Data

May 4, 2000 (EP) ............................................. 00201604

(51) Int. Cl.[7] ................................................. F21V 8/00
(52) U.S. Cl. ......................................................... 362/31
(58) Field of Search ............................................ 362/31

(56) References Cited

U.S. PATENT DOCUMENTS

| 4,860,171 A | * | 8/1989 | Kojima .......................... 362/31 |
| 5,027,258 A | * | 6/1991 | Schoniger et al. ............. 362/31 |
| 5,079,675 A | * | 1/1992 | Nakayama .................... 362/31 |
| 5,410,454 A | * | 4/1995 | Murase et al. ................. 362/31 |
| 5,584,556 A | * | 12/1996 | Yokoyama et al. ........... 362/31 |
| 5,971,559 A | * | 10/1999 | Ishikawa et al. .............. 362/31 |
| 6,308,444 B1 | * | 10/2001 | Ki ................................. 362/31 |

FOREIGN PATENT DOCUMENTS

| EP | 0446324 | 11/1996 | ............ F21V/8/00 |
| WO | WO0005706 | 7/1999 | |

OTHER PUBLICATIONS

Patent Abstracts of Japan, vol. 2000, No. 05, Sep. 14, 2000, JP 2000036207 A.

Patent Abstrcts of Japan, VO. 2000, No. 07, Sep. 29, 2000, JP 2000100231 A.

* cited by examiner

Primary Examiner—Laura K. Tso

(57) ABSTRACT

A backlight system comprises at least two light-emitting panels (1; 11) having a front wall (2; 12), an opposing rear wall (3; 13) and opposite edge surfaces (4, 14; 5, 15). At least one of the edge surfaces (4; 14) is light-transmitting and associated with a plurality of light sources (6, 16). Light originating from the light sources (6; 16) is diffused in the panel (1; 11). Sub-surfaces (8, 18) of the rear walls (3, 13) are provided with means for extracting light from the panel (1, 11). In operation, said sub-surfaces (8, 18) project light on areas (9, 19) of an (imaginary) plane (40) which is positioned parallel to the light-emitting panels (1, 11). Said projected areas (9, 19) in the plane (40) are substantially contiguous. Preferably, said sub-surfaces (8, 18) are remote from the light-transmitting edge surfaces (4; 14). Preferably, each of said sub-surfaces (8, 18) forms a single surface covering half the front wall (2, 12) of the light-emitting panel (1, 11). Alternatively, the sub-surfaces encompass a substantial area of the rear walls, the distribution of the means for extracting light from the panel being such that the amount of extracted light changes as a function of the distance to the light-transmitting edge surfaces. Preferably, the light source comprises a plurality of red, green, blue (and amber) LEDs, each preferably having a luminous flux of at least 5 lumen.

20 Claims, 6 Drawing Sheets

ILLUMINATION SYSTEM AND DISPLAY DEVICE

The invention relates to an illumination system for illuminating a display device, which illumination system is provided with a light-emitting panel comprising a front wall, a rear wall situated opposite said front wall, and edge areas between the front wall and the rear wall, at least one of the edge areas of the panel being light-transmitting, at least one light source being associated with the light-transmitting edge area, and in operation, light originating from the light source being incident on the light-transmitting edge area and spreading in the panel.

The invention also relates to a display device comprising said illumination system.

Such illumination systems are known per se and are alternatively referred to as edge-lighting systems. They are used, inter alia, as backlighting of (image) display devices, for example for television receivers and monitors. Such illumination systems can particularly suitably be used as a backlight for non-emissive displays, such as liquid crystal display devices, also referred to as LCD panels, which are used in (portable) computers or (cordless) telephones.

Said display devices generally include a substrate provided with a regular pattern of pixels, which are each driven by at least one electrode. In order to reproduce an image or a datagraphic representation in a relevant area of a (display) screen of the (image) display device, the display device uses a control circuit. In an LCD device, the light originating from the backlight is modulated by means of a switch or a modulator, while applying various types of liquid crystal effects. In addition, the display may be based on electrophoretic or electromechanical effects.

In the illumination systems mentioned in the opening, paragraph, customarily a tubular low-pressure mercury-vapor discharge lamp, for example one or more compact fluorescent lamps, is used as the light source, the light which, in operation, is emitted by the light source being coupled into the light-emitting panel which serves as an optical waveguide. This optical waveguide generally forms a comparatively thin and flat panel which is made, for example, of a synthetic resin or glass, light being transported through the optical waveguide under the influence of (total) internal reflection.

Such an illumination system may also be provided with an alternative light source in the form of a plurality of opto-electronic elements, also referred to as electro-optic elements, such as electroluminescent elements, for example light-emitting diodes (LEDs). These light sources are generally provided in the proximity of or contiguous to a light-transmitting edge area of the light-emitting panel, so that, in operation, light originating from the light source is incident on the light-transmitting edge area and spreads in the panel.

EP-A 446 324 discloses an illumination system which causes an LCD panel to be illuminated at different types of ambient light. For the light source use is made of incandescent lamps which couple light into a light-emitting panel, also referred to as light pipe. In the light-emitting panel, multiple reflections of light bring about a light distribution to illuminate the LCD panel.

An illumination system of the above-mentioned type has the disadvantage that the light distribution in the light-emitting panel, particularly in the proximity of the light source, is insufficiently uniform. As a result, the illumination uniformity of the display device is insufficient.

It is an object of the invention to completely or partly overcome the above-mentioned drawback. The invention more particularly aims at providing an illumination system of the type mentioned in the opening paragraph, wherein the uniformity of the light distribution of the illumination system and hence the uniformity with which the display device is illuminated are improved.

In accordance with the invention, this object is achieved in that, the illumination system comprises at least two light-emitting panels, which panels are arranged at least substantially parallel to each other, and sub-surfaces of the rear walls of each of the light-emitting panels are provided with means for coupling light out of the panel, the sub-surfaces projecting, in operation, light on regions of a projection area extending parallel to the light-emitting panels, and the projected regions in the projection area at least being contiguous.

The use of a plurality of light-emitting panels in the illumination system in accordance with the invention has the advantage that the sub-surfaces of each of the rear walls of the light-emitting panels co-operate with each other so as to uniformly illuminate the display device. Both the choice of the sub-surfaces and the distribution of the means for coupling out light over the sub-surfaces are such that the light emitted, in operation, by each of the sub-surfaces uniformly illuminates the (imaginary) projection area. As the projection area corresponds to the display device surface to be illuminated, a uniformly illuminated projection area leads to a uniform illumination of the (image) display device.

By virtue of the measure in accordance with the invention, the uniformity of the distribution of the light emitted by the illumination system is improved. As a result, a more uniform illumination of the (image) display device is obtained.

A further advantage of the application of multiple light panels resides in that the light output and the light distribution of each of the panels can be influenced individually.

In order to save space, the light panels are preferably arranged one behind another.

The arrangement of the sub-surfaces with respect to the light source influences the way in which light issues from the light-emitting panel. A preferred embodiment of the illumination system in accordance with the invention is characterized in that the sub-surfaces are situated at a distance from the light-transmitting edge areas.

Particularly in the proximity of the light source, the light distribution of the known light-emitting panel is insufficiently uniform. If, in accordance with the invention, the sub-surfaces, which couple light out of the panel, are chosen so as to be not adjacent or near the light source associated with the relevant light-emitting panel, the,n the influence of the light source on the light coupled out by the panel is reduced.

The shape of the sub-surfaces and their position with respect to each other, in combination with the way in which the means for coupling out light are distributed over the sub-surfaces, influence the way in which light issues from the light-emitting panels. A favorable embodiment of the illumination system is characterized in accordance with the invention in that each of the sub-surfaces comprises a single surface covering approximately half the rear wall of the light-emitting panel, the means for coupling, out light being provided such that the degree to which light is coupled out is substantially constant over the sub-surface.

In this preferred embodiment, the illumination system comprises two light-emitting panels, each of the light-emitting panels being responsible for approximately half the light emitted by the illumination system. The means for coupling out light are uniformly distributed over said sub-surfaces in such a manner that the light emitted by the sub-surfaces very uniformly illuminates the corresponding part of the imaginary projection area. A uniformly illuminated display device is obtained by arranging the sub-surfaces preferably on a part of the rear wall which is situated at a (maximum) distance from the light-transmitting edge-area.

It is particularly favorable if the light-transmitting edge areas are alternately situated at opposite sides of the panels. As a result, the sub-surface of one light-emitting panel illuminates one half of the display device, for example the lower half, while the sub-surface of the other light-emitting panel illuminates the other half of the display device, for example the upper half. This has the advantage that the two halves of the display device may have different illumination levels. A further advantage thereof is that the display screen of the display device is suitable for spatial sequential operation. In an alternative embodiment, a ridge is formed in one of the sub-surfaces or in both sub-surfaces, thereby effectively precluding the mixing of light between the two halves of the display device.

In an alternative embodiment, the illumination system comprises three light-emitting panels, each of which couples out approximately one third of the light.

In addition to the above-described uniform distribution of the means for coupling out light over the sub-surfaces, it is advantageous, in alternative embodiments, to distribute the means non-uniformly over the sub-surface. Also a suitably chosen inhomogeneous distribution of the means for coupling out light enables the light emitted by the various sub-surfaces to very uniformly illuminate the imaginary projection area. For this purpose, a preferred, alternative embodiment of the illumination system in accordance with the invention is characterized in that the sub-surfaces extend over a substantial part of the rear wall of the light-emitting panels, the means for coupling out light being arranged such that the degree to which light is coupled out changes as a function of the distance to the light-transmitting edge area.

If the means for coupling out light are uniformly distributed over the sub-surfaces, particularly the interfaces in the projection area between light originating from the various sub-surfaces are sensitive to misalignment of the light-emitting panels. The inventors have recognized that if the means for coupling out light are not uniformly distributed over the sub-surfaces, the degree to which light is coupled out changing as a function of the distance to the light-transmitting edge area, the light distribution over the imaginary projection area as a result of coupling out light by the light-emitting panels becomes less sensitive to obliqueness of the light-emitting panels or to a sub-optimal alignment of the light-emitting panels.

Preferably, the means are distributed over the entire rear wall of each of the light-emitting panels, the degree to which light is coupled out being comparatively small in the proximity of the light-transmitting edge areas, and comparatively large in the proximity of the opposite edge area. In this embodiment, each one of the light-emitting panels contributes to the illumination of at least substantially the entire surface of the projection area, but the contribution to the illumination of the light-emitting panel in the proximity of the light-transmitting edge areas is so small that effects of the light source on the light coupled out by the panel are negligibly small. In this embodiment, the degree to which each of the light-emitting panels contributes to the illumination of an imaginary point of the projection area depends substantially upon the position of said imaginary point in the projection area.

In accordance with a particularly suitable distribution, the means for coupling out light are arranged such that the degree to which light is coupled out changes linearly as a function of the distance to the light-transmitting edge area. In an alternative, favorable embodiment, the means are arranged such that the coupling out of light changes as a square of a sine or a cosine.

In an alternative embodiment of the illumination system in accordance with the invention, one of the light-emitting panels does not extend over the whole length of the projection area. This is suitable, in particular, if there is a lack of space on one of the two sides of the illumination system. This is the case, for example, if the connection wires for electrodes at edges of the LCD display device are diverted round the illumination system. The connection wires are customarily situated at two successive sides of the LCD display device. As a result, there is ample room for the light source of the illumination system at two of the sides of the display device, while there is comparatively less pace at the other, opposite sides. By shortening one of the light-emitting panels, more space is created at the latter side of the display device.

Preferably, the light source comprises at least one light-emitting diode having a luminous flux of at least 5 lm. LEDs having such a high output are also referred to as LED power packages. The use of these high-efficiency, high-output LEDs has the specific advantage that, at a desired, comparatively high light output, the number of LEDs may be comparatively small. This has a positive effect on the compactness and efficiency of the illumination system to be manufactured. Further advantages of the use of LEDs are a comparatively very long service life, comparatively low energy costs and comparatively low maintenance costs of an illumination system comprising LEDs.

The use of LEDs has the further advantage that dynamic illumination possibilities are obtained. For this purpose, a preferred embodiment of the illumination system in accordance with the invention is characterized in that a sensor for measuring the optical properties of the light emitted, in operation, by the light source is situated at the edge area of the light-emitting panels that is situated opposite the light-transmitting edge surface. If different types of LEDs are combined and/or LEDs of different colors are employed, colors can be mixed in a desirable manner, for example, to make white light of the desired color temperature. In addition, color changes can be brought about irrespective of the condition of the display device. The sensor can alternatively be provided on a different (edge) area of the light-emitting panel.

In a further preferred embodiment, the illumination system comprises control electronics for changing the luminous flux of the light source. Suitable control electronics enable the desired illumination effects to be obtained and the uniformity of the coupled-out light to be improved. In addition, a suitable combination of LEDs enables white light to be obtained, and a desired color temperature can be adjusted by means of control electronics.

In a preferred embodiment of the illumination system, the light source comprises at least two light-emitting diodes having different light-emission wavelengths. Such diodes emit light in a predetermined wavelength range. The LEDs comprise preferably the combinations of red, green and blue LEDs which are known per se, or combinations of red, green, blue and amber LEDs.

These and other aspects of the invention will be apparent from and elucidated with reference to the embodiment(s) described hereinafter.

In the drawings.

The Figures are purely diagrammatic and not drawn to scale. Particularly for clarity, some dimensions are exaggerated strongly. In the Figures, like reference numerals refer to like parts whenever possible.

Figure 1A:
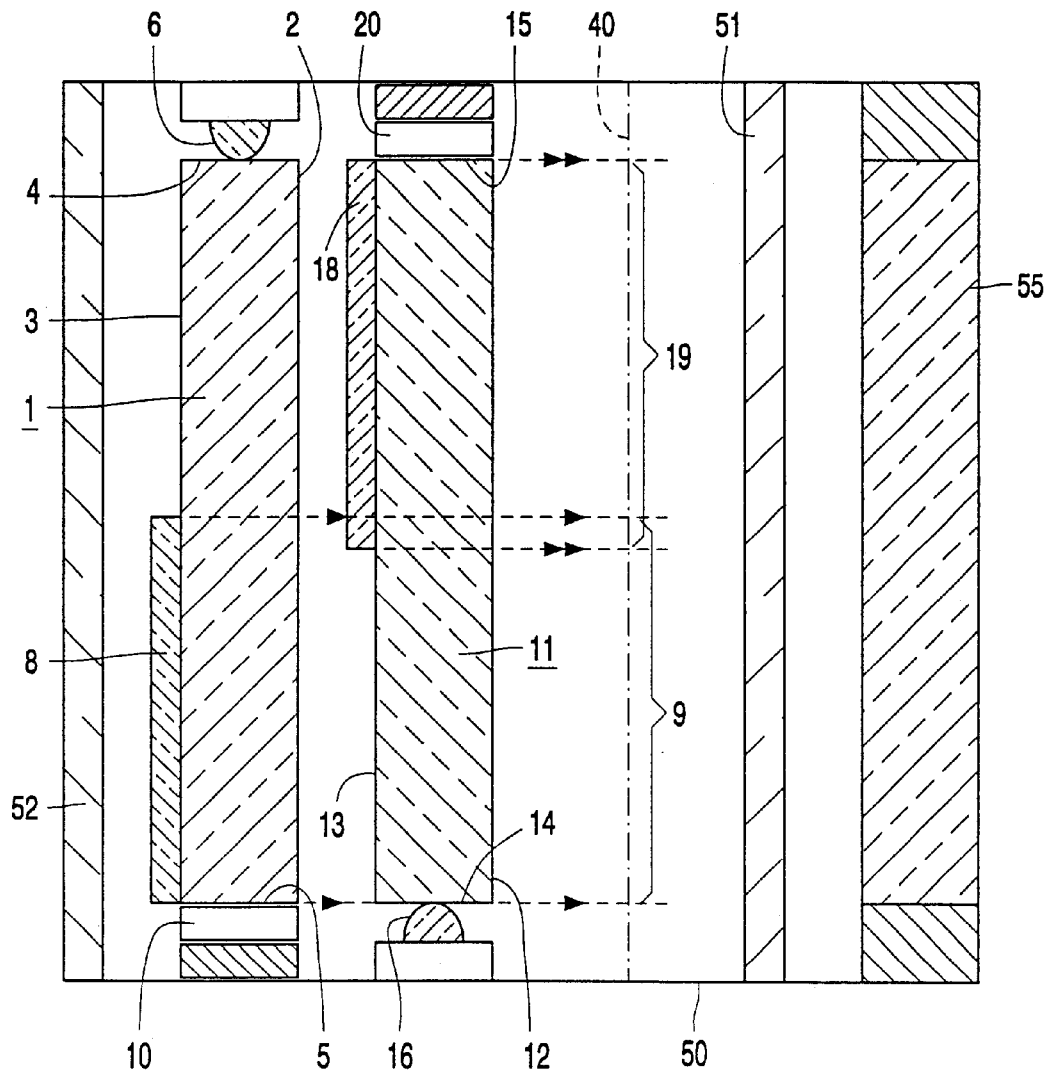
FIG. 1A is a cross-sectional view of a display device comprising an embodiment of the illumination system in accordance with the invention.

FIG. 1A is a cross-sectional view of an embodiment of an illumination system in accordance with the invention. The illumination system comprises a light-emitting panel 1; 11 of a light-transmitting material. The panel 1; 11 is made from, for example, a synthetic resin, acryl, polycarbonate, PMMA, such as Perspex, or glass. In operation, light is transported through the panel 1; 11 under the influence of total internal reflection. The panel 1; 11 has a front wall 2; 12 and a rear wall 3; 13 opposite said front wall. Between the front wall 2; 12 and the rear wall 3; 13 there are edge areas 4, 14; 5, 15. Irk the example shown in FIG. 1A, the edge area referenced 4; 14 is light-transmitting, and at least one light source 6; 16 is associated therewith. In operation, light originating from the light source 6; 16 is incident on the light-transmitting edge area 4; 14 and diffuses in the panel 1; 11.

Figure 1B:
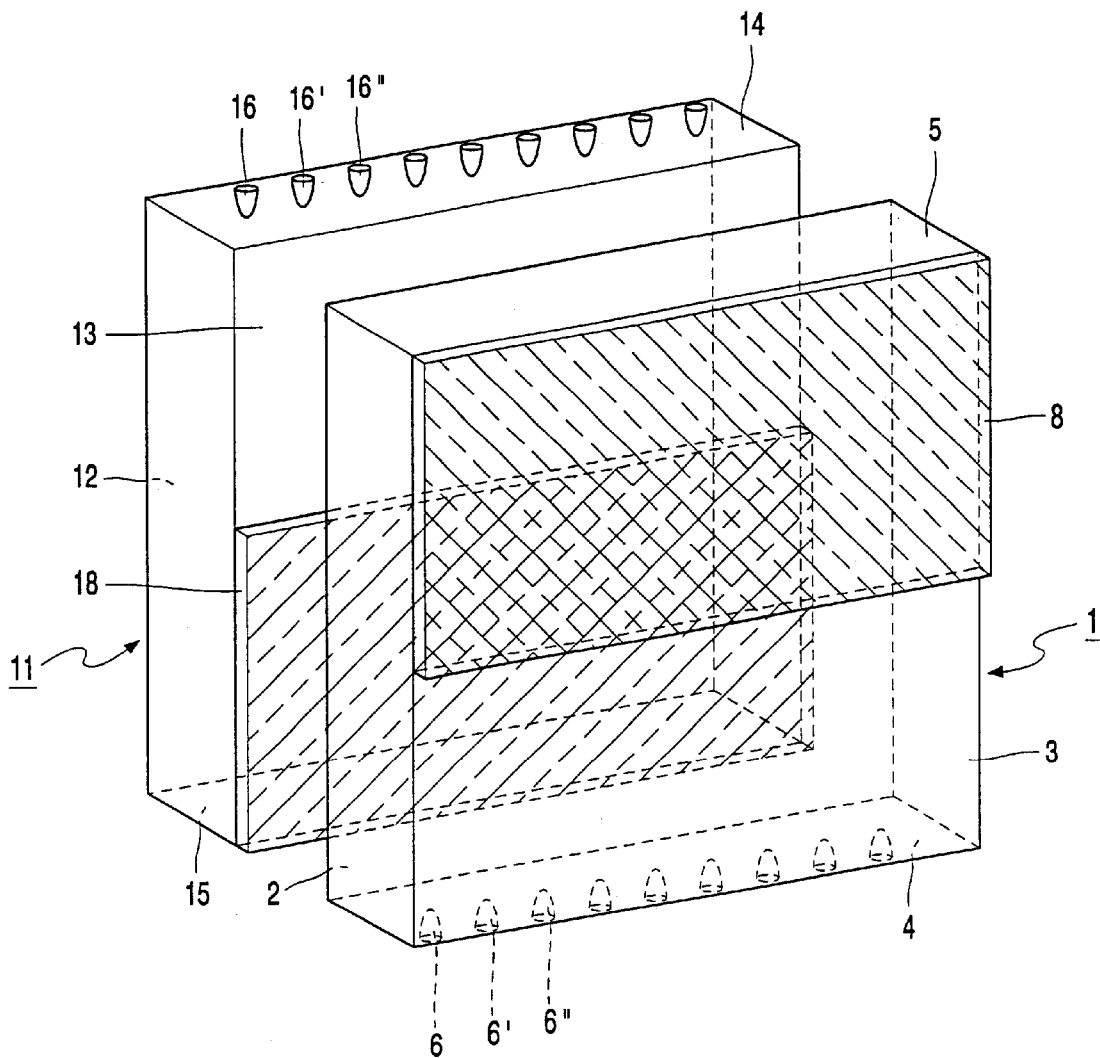
FIG. 1B is a perspective view of a detail of the illumination system shown in FIG. 1A.

In accordance with the invention, the illumination system comprises at least two light-emitting panels 1, 11, said panels 1, 11 being arranged one behind the other and at least substantially parallel to each other (also see FIG. 1B). Sub-surfaces 8, 18 of the rear wall 3, 13 of each one of the light-emitting panels 1, 11 are provided with means for coupling light out of the panel 1, 11. These means comprise (patterns of) deformities and, for example, screen-printed dots, wedges and/or ridges. The means are provided, for example, by means of etching, scribing or sandblasting in the rear wall of the panel 1, 11. In an alternative embodiment, the deformities are provided in the front wall 2, 12 of the panel 1, 11. The means couple light out of the panel 1, 11 by reflection, scattering and/or refraction.

Said sub-surfaces 8, 18 of the light-emitting panels 1, 11 project, in operation, light on regions 9, 19 of an imaginary projection area 40 parallel to the light-emitting panels 1, 11. The projections of the light originating from the panels 1, 11 are diagrammatically indicated in FIG. 1A by means of broken lines, the regions 9, 19 on the imaginary projection area 40 are indicated by means of brackets referenced 9 and 19, respectively. In FIG. 1A, the projected areas 9, 19 demonstrate a small overlap in the projection area 40.

In this example, the light source 6, 16 comprises a plurality of light-emitting diodes (LEDs) (see FIG. 1B), but alternatively use can be made of a different light source, such as a discharge lamp or, in general, a plurality of optoelectronic (elements also referred to as electro-optic elements, for example electroluminescent elements. The source brightness of LEDs is many times that of fluorescent tubes. In addition, when use is made of LEDs, the efficiency with which light is coupled into the panel is higher than in the case of fluorescent tubes. The use of LEDs as a light source has the advantage that the LEDs may contact panels made of a synthetic resin. LEDs hardly emit heat in the direction of the light-emitting panel 1; 11 and do not emit detrimental (UV) radiation. The use of LEDs has the additional advantage that means for coupling light originating from the LEDs into the panel can be dispensed with. The application of LEDs leads to a more compact illumination system.

In FIG. 1A, an optional diffuser 51 and a reflecting diffuser 52 are shown, which bring about further mixing of the light originating from the light-emitting panels 1; 11. FIG. 1A further very diagrammatically shows a LCD panel, referenced 55. The assembly of the panels 1, 11, the light source 6, 16, the diffuser 51, the LCD panel 55 and a housing 50 forms a display device for displaying, for example, (video) images.

In FIG. 1A, each light-emitting panel 1, 11 is provided with a sensor 10, 20 for measuring the optical properties of the light which, in operation, is emitted by the light source 6, 16. This sensor 10, 20 is coupled to control electronics (not shown in FIG. 1A) for suitably adapting and/or changing the luminous flux of the light source 6, 16. By means of the sensor 10, 20 and the control electronics a feedback mechanism can be formed which is used to influence the quality and the quantity of the light coupled out of the panel 1, 11.

FIG. 1B is a very diagrammatic, perspective view of a detail of the illumination system shown in FIG. 1A. Light originating from a plurality of LEDs 6, 6', 6", . . . ; 16, 16', 16", . . . is coupled into the panel 1, 11 via the light-transmitting edge area 4, 14. The light is coupled out via sub-surfaces 8, 18 of the rear walls 3, 13 which are provided, for this purpose, with means for coupling light out of the panel 1, 11.

In the example shown in FIG. 1B, LEDs of three different colors are used, namely red LEDs 6; 16, green LEDs 6'; 16' and blue LEDs 6'; 16'. In an alternative embodiment, also amber LEDs are used which have a comparatively high light output.

The LEDs used preferably have a luminous flux of at least 5 lm. LEDs having such a high output are alternatively referred to as LED power packages. Examples of power LEDs are "Barracuda"-type LEDs (Lumileds). The luminous flux per LED is 15 lm for red LEDs, 13 lm for green LEDs, 5 lm for blue LEDs and 20 lm for amber LEDs. In an alternative embodiment, "Prometheus"-type power LEDs (Lumileds) are used, having a luminous flux per LED of 35 lm for red LEDs, 20 lm for green LEDs, 8 lm for blue LEDs and 40 lm for amber LEDs.

Preferably, the LEDs are mounted on a (metal-core) printed circuit board. If power LEDs are provided on such a (metal-core) printed circuit board (PCB), the heat generated by the LEDs can be readily dissipated by thermal conduction via the PCB. In an interesting embodiment of the illumination system, the (metal-core) printed circuit board is in contact with the housing of the display device via a heat-conducting connection.

In operation, light originating from the light source 6, 6', 6", . . . ; 16, 16', 16", . . . is coupled into the panel 1; 11 via the light-transmitting edge area 4; 14, which light diffuses in the panel 1; 11. In accordance with the principle of total internal reflection, the light continues to move back and forth in the panel 1; 11, unless the light is coupled out of the panel 1; 11 by means of, for example, a deliberately provided deformation (the means at the location of the sub-surfaces 8, 18). The edge area opposite the light-transmitting edge area 4; 14 bears reference numerals 5; 15 and is preferably provided, with the exception of the location where the sensor 10; 20 is situated (not shown in FIG. 1B), with a reflecting coating (not shown in FIGS. 1A and 1B) for maintaining the light originating from the light source 6, 6', 6", . . . ; 16, 16', 16", . . . inside the panel.

The means provided in the rear wall 3; 13 of the light-emitting panel 1; 11 serve as a secondary light source. A specific optical system may be associated with this second light source, which optical system may be provided, for example, on the front wall 2; 12 (not shown in FIGS. 1A and 1B). The optical system may be used, for example, to form a wide light beam.

Figure 2:
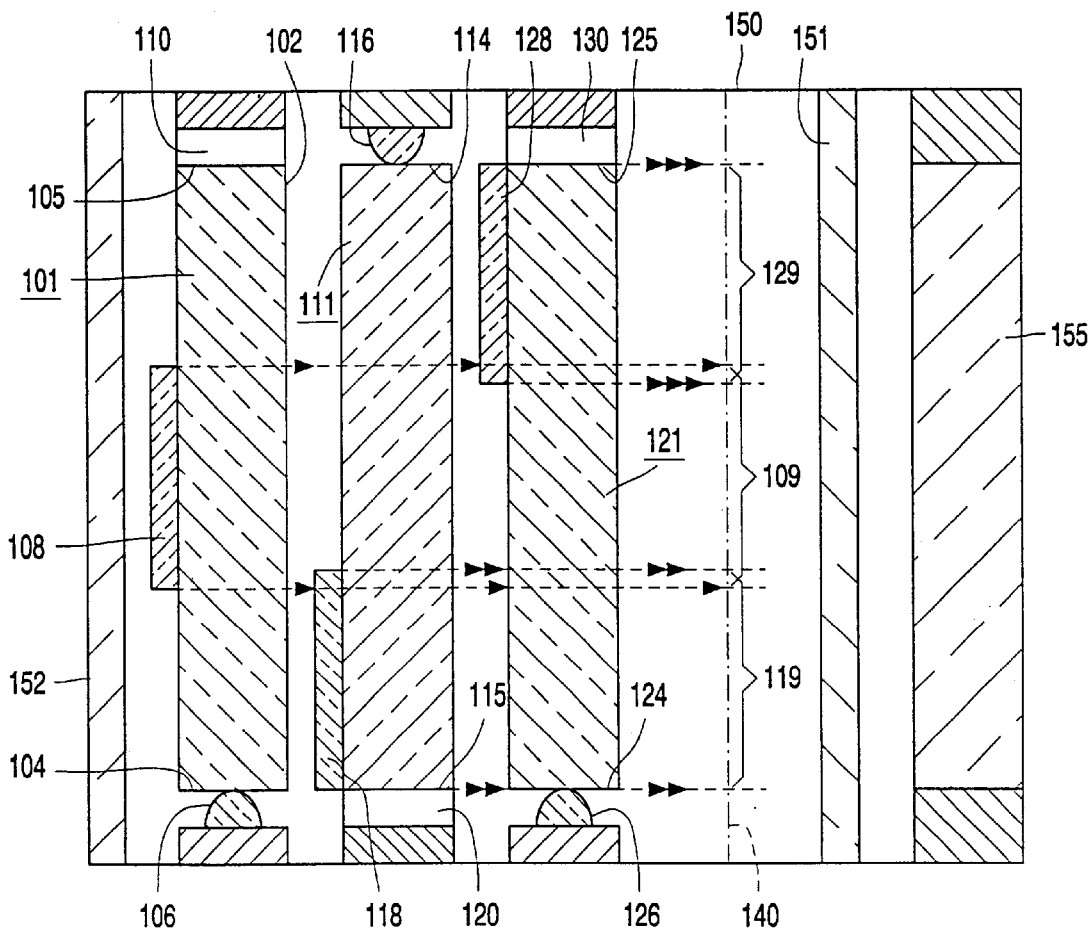
FIG. 2 is a cross-sectional view of an alternative embodiment of a display device comprising an alternative embodiment of the illumination system in accordance with the invention.

FIG. 2 shows, in cross-section, an alternative embodiment of a display device comprising an alternative embodiment of the illumination system in accordance with the invention. As compared to FIGS. 1A and 2A, corresponding parts in FIG. 2 are denoted by reference numerals which are 100 higher. The illumination system comprises a light-emitting panel 101; 111; 121 of a light-transmitting material. The panel 101; 111; 121 has a front wall 102; 112; 122 and a rear wall 103; 113; 123 opposite said front wall. Edge areas 104, 105; 114, 115; 124, 125 are situated between the front wall 102; 112; 122 and the rear wall 103; 113; 123. In the example shown in FIG. 2, the edge area bearing reference numeral 104; 114; 124 is light-transmitting, and at least one light source 106; 116; 126 is associated therewith.

The embodiment of the illumination system in accordance with the invention as shown in FIG. 2 comprises three parallel light-emitting panels 101, 111, 121. Sub-surfaces 108, 118, 128 of the rear walls 103, 113, 123 of each one of the light-emitting panels 101, 111, 121 are provided with means for coupling light out of the panel 101, 111, 121. In operation, said sub-surfaces 108, 118, 128 project light on areas 109, 119, 129 of an imaginary projection surface 140 parallel to the light-emitting panels 101, 111, 121. The projections of the light originating from the panels 101, 111, 121 are diagrammatically shown in FIG. 2 by means of broken lines, the regions 109, 119, 129 on the imaginary projection surface 140 are indicated by means of brackets provided with the respective reference numerals 109, 119 and 129. In FIG. 2, the projected regions 109, 119 129 demonstrate a small overlap in the projection surface 140.

In this example, the light source 106; 116; 126 comprises a plurality of light-emitting diodes (LEDs). In the example shown in FIG. 2, the LEDs are provided on the lower side of the panel 101, on the upper side of the panel 111 and again on the lower side of the panel 121. The light-transmitting edge areas 105, 115, 125 are situated alternately on opposite sides of the panels 101, 111, 121. By virtue thereof, the possibilities of locating the LEDs are increased and the heat balance of the panels 101, 111, 121 is favorably influenced.

FIG. 2 shows an optional diffuser 151 and a reflecting diffuser 152, which bring about further mixing of the light originating from the light-emitting panels 101; 111; 121. FIG. 2 also shows, very diagrammatically, a LCD panel referenced 155. The assembly of the panels 101, 111, 121, the light source 106, 116, 126, the diffuser 151, the LCD panel 155 and a housing 150 forms a display device for displaying, for example, (video) images.

In FIG. 2, each light-emitting panel 101, 111, 121 is provided with a sensor 110, 120, 130 for measuring the optical properties of the light which in operation, is emitted by the light source 106, 116, 126. This sensor 110, 120, 130 is coupled to control electronics (not shown in FIG. 2) for suitably adapting and/or changing the luminous flux of the light source 106, 116, 126.

Figure 3A:
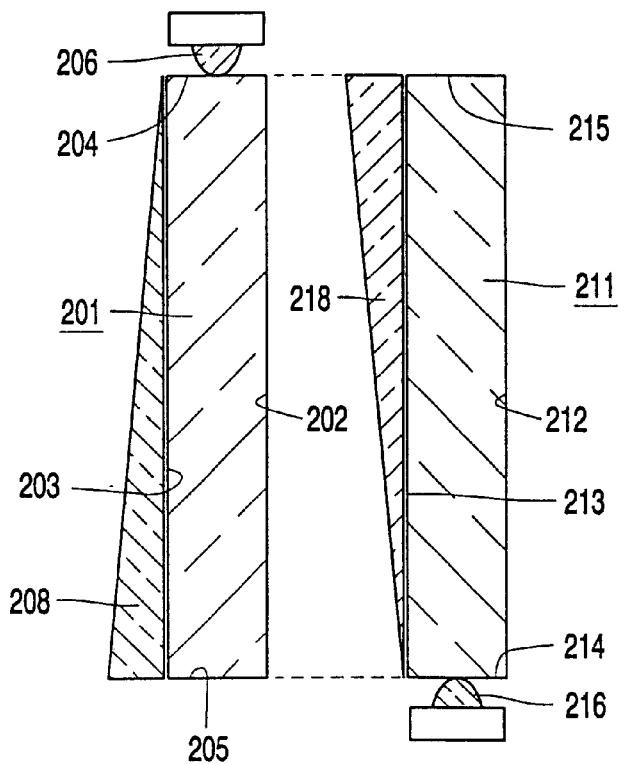
FIG. 3A is a cross-sectional view of a detail of an alternative embodiment of the illumination system in accordance with the invention.

FIG. 3A is a diagrammatic, cross-sectional view of a detail of an alternative embodiment of the illumination system in accordance with the invention. With respect to FIG. 2, corresponding parts in FIG. 3A have a reference numeral which is 100 higher. The illumination system comprises two parallel-arranged light-emitting panels 201, 211 having a front wall 202, 212 and a rear wall 203, 213. The edge areas bearing reference numeral 204, 214 are light-transmitting and associated with at least one light source 206, 216.

In the embodiment of the illumination system in accordance with the invention, as shown in FIG. 3A, the sub-surfaces 208, 218 comprise the entire rear wall 203, 213 of the light-emitting panels 201, 211. The drawing also diagrammatically shows that the means for coupling out light are arranged such that the degree to which light is coupled out changes linearly as a function of the distance to the light-transmitting edge surface 204, 214. In the proximity of the light source 206, 216, the amount of light coupled out is small, while in the proximity of the edge area 205, 215 situated opposite the light-transmitting edge area 204, 214, the amount of light coupled out is maximal. The light distribution over the (imaginary) projection surface (not shown in FIG. 3A) is caused everywhere by light which is coupled out of each one of the light-emitting panels, the contribution per light-emitting panel to the illumination of an (imaginary) point on the projection surface changing (substantially) from place to place. As a result, the light distribution over the projection surface due to the coupling out of light by the light-emitting panels is less sensitive to misalignment of said light-emitting panels.

Figure 3B:
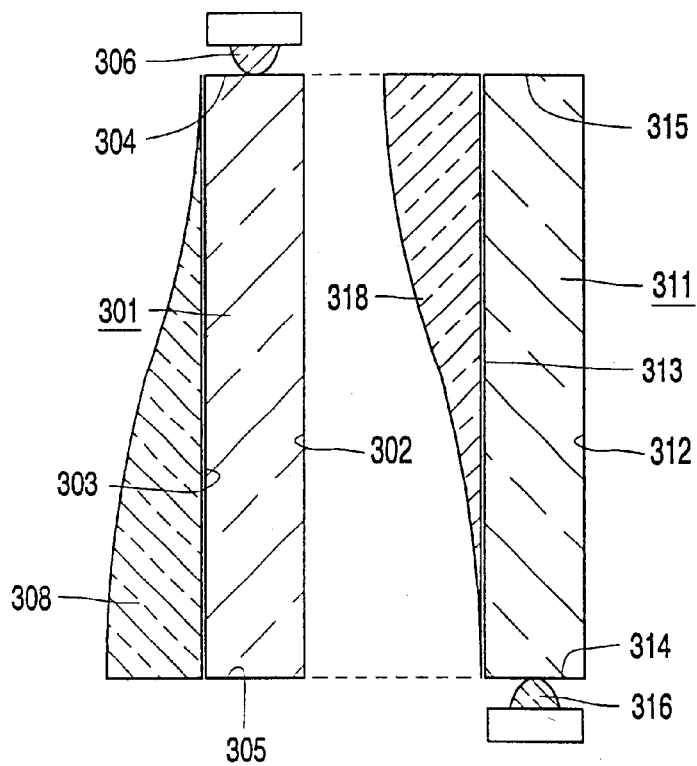
FIG. 3B is a cross-sectional view of a detail of a further, alternative embodiment of the illumination system in accordance with the invention.

FIG. 3B is a diagrammatic, cross-sectional view of a detail of a further, alternative embodiment of the illumination system in accordance with the invention. With respect to FIG. 3A, corresponding parts in FIG. 3B have reference numerals which are 100 higher. The illumination system comprises two parallel-arranged light-emitting panels 301, 311 having a front wall 302, 312 and a rear wall 303, 313. The edge areas referenced 304, 314 are light-transmitting and associated with at least one light source, 306, 316.

In the embodiment of the illumination system in accordance with the invention shown in FIG. 3B, the sub-surfaces 308, 318 comprise the entire rear wall 303, 313 of the light-emitting panels 301, 311. The drawing further very diagrammatically shows that the means for coupling out light are provided such that the coupling out of light as a function of the distance to the light-transmitting edge area 304, 314 changes for one of the light-emitting panels in accordance with the square of a sine, while the coupling out of light of the other light-emitting panel changes in accordance with the square of a cosine. Since the sum of the squares of the sine and the cosine is constant, a very uniform light distribution over the projection surface (not shown in FIG. 3B) is obtained. In addition, in the example shown in FIG. 3B, the amount of light coupled out in the proximity of the light source 306, 316 is small, while the amount of light coupled out of the light-emitting panel in the proximity of the edge surface 305, 315 situated opposite the light-transmitting edge surface 304, 314 is maximal. As a result, the light distribution over the projection surface as a result of the coupling out of light by the light-emitting panels is less sensitive to misalignment of said light-emitting panels.

Figure 4A:
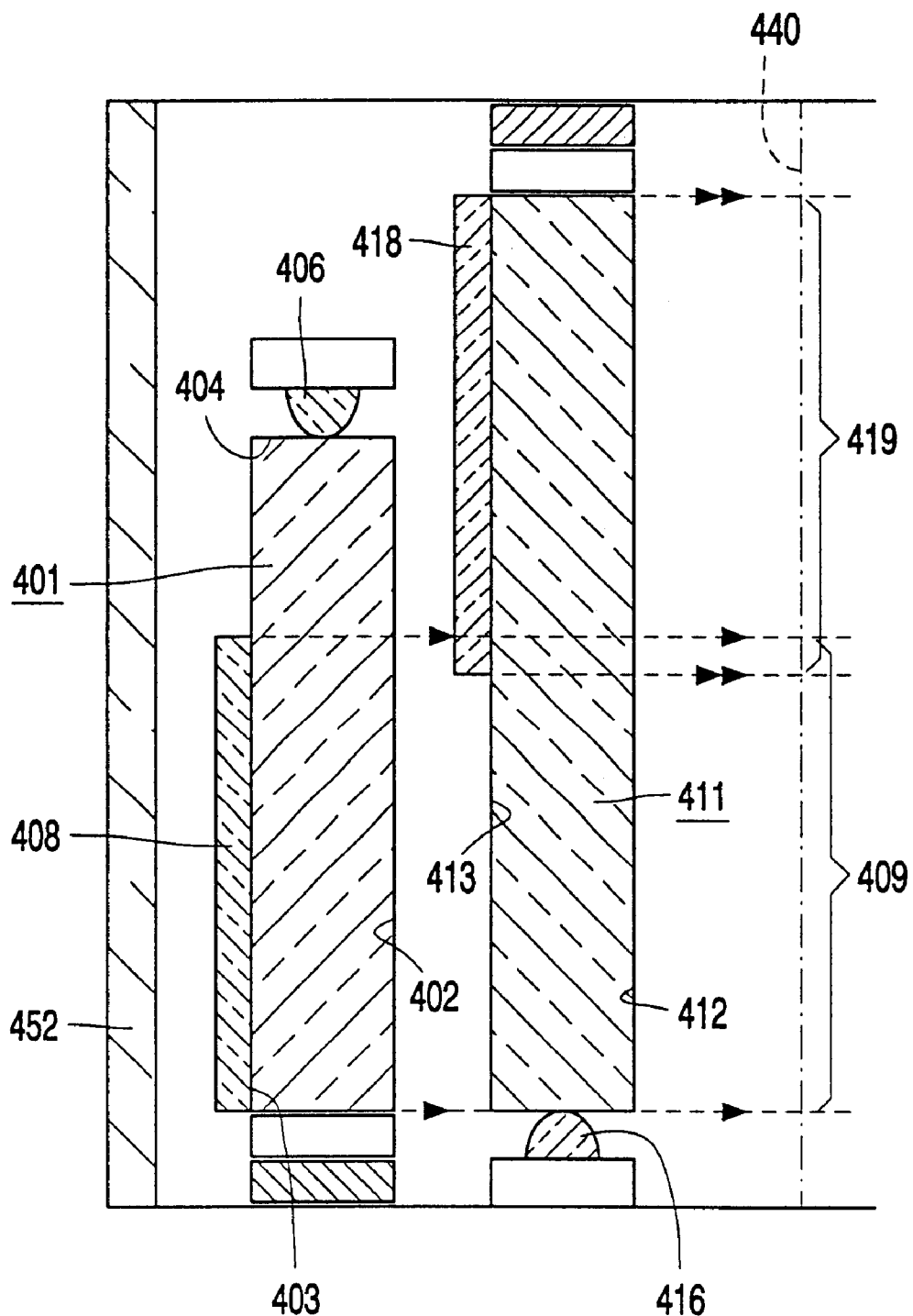
FIG. 4A is a cross-sectional view of an alternative embodiment of the illumination system in accordance with the invention.

FIG. 4A is a diagrammatic, cross-sectional view of an alternative embodiment of the illumination system in accordance with the invention. With respect to FIGS. 1A and 1B, corresponding parts in FIG. 4A have reference numerals which are 400 higher. The illumination system comprises two parallel-arranged light-emitting panels 401; 411, each having a front wall 402; 412 and a rear wall 403; 413 opposite said Font wall. The edge surface referenced 404 is light-transmitting and at least one light source 406 is associated therewith. In this example, the light source 406; 416 comprises a plurality of light-emitting diodes (LEDs). The illumination system is provided with a reflecting, diffuser 442.

Sub-surfaces 408, 418 of the rear walls 403, 413 of each one of the light-emitting panels 401, 411 are provided with means for coupling light out of the panel 401, 411. In operation, said sub-surfaces 408, 418 project light on regions 409, 419 of an imaginary projection surface 440 parallel to the light-emitting panels 401, 411. The projections of the light originating from the panels 401, 411 are diagrammatically shown in FIG. 4A by means of broken lines, the regions 409, 419 on the imaginary projection area 440 are indicated by means of brackets provided with the respective reference numerals 409 and 419.

In the example shown in FIG. 4A, the light-emitting panel referenced 401 is shorter than the light-emitting panel referenced 411. Thus, the part used to mix the light originating from the light-emitting panel has become shorter, however, in the illumination system space has been obtained enabling, for example, connection wires for electrodes at edges of the LCD display device to be passed through said space and provided.

Figure 4B:
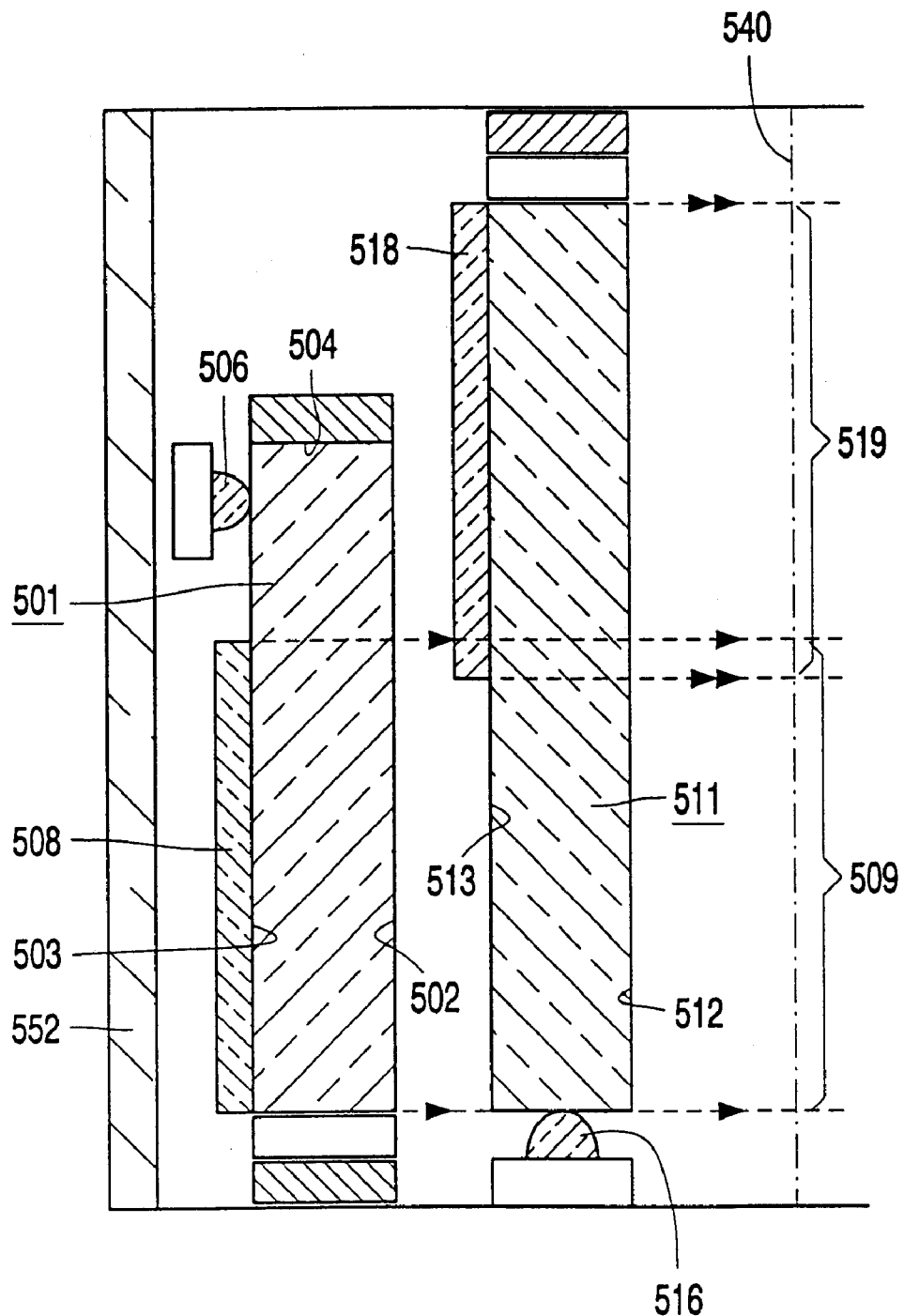
FIG. 4B is a cross-sectional view of a further alternative embodiment of the illumination system in accordance with the invention.

FIG. 4B is a diagrammatic, cross-sectional view of an alternative embodiment of the illumination system in accordance with the invention. With respect to FIG. 4A, corresponding parts in FIG. 4B have reference numerals which are 100 higher. The illumination system comprises two parallel-arranged light-emitting panels 501; 511, each having a front wall 502; 512 and a rear wall 503; 513 opposite said front wall. In this example, the edge area bearing reference numeral 504 is not light-transmitting but, preferably, provided with a reflecting coating. On the other hand, a part of the rear wall 503 of the panel is light-transmitting and at least one light source 506 is associated therewith, which light source is arranged, in this example, at right angles to the longitudinal axis of the light-emitting panel 501. The light source 506; 516 comprises, in this, example, a plurality of light-emitting diodes (LEDs). The illumination system is provided with a reflecting diffuser 542.

Sub-surfaces 508, 518 of the rear walls 503, 513 of each one of the light-emitting panels 501, 511 are provided with means for coupling light out of the panel 501, 511. In operation, said sub-surfaces 508, 518 project light on regions 509, 519 of an imaginary projection surface 540 parallel to the light-emitting panels 501, 511.

In the example shown in FIG. 5A, the light-emitting panel referenced 501 is shorter than the light-emitting panel referenced 511. Thus, the part used for mixing the light originating from the light-emitting panel has become shorter, however, in the illumination system space has been obtained enabling, for example, connection wires for electrodes at edges of the LCD display device to be passed through said space and provided. In addition, the light source 506 is arranged at right angles to the longitudinal axis, of the light-emitting panel 501, which leads to a further saving of space. In an alternative (embodiment, also the light source 516 is arranged at right angles to the longitudinal axis of the light-emitting panel 511.

It will be clear that, within the scope of the invention, many variations are possible to those skilled in the art.

The scope of protection of the invention is not limited to the examples given hereinabove. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an" in front of an element does not exclude the presence of a plurality of such elements.

What is claimed is:

1. An illumination system for illuminating a display device, said illumination system comprising:
   a first light source operable to emit a first band of light;
   a first light emitting panel including a first light transmitting edge area operable to receive the first band of light, said first light emitting panel further including a first sub-surface on a first wall, said first sub-surface operable to couple at least a portion of the first band of light out of said first light emitting panel,
   wherein a degree in which the at least a portion of the first band of light is coupled out of said first light emitting panel varies as a function of a distance between said first light transmitting edge area and said first sub-surface;
   a second light source operable to emit a second band of light; and
   a second light emitting panel including a second light transmitting edge area operable to receive the second band of light said second light emitting panel further including a second sub-surface on a second wall, said second sub-surface operable to couple at least a portion of the second band of light out of said second light emitting panel.

2. The illumination system of claims 1, wherein the degree in which the at least a portion of the first band of light is coupled out of said first light emitting panel increases as a function of the distance between said light transmitting edge area and said first sub-surface.

3. The illumination system of claim 1, wherein the degree in which the at least a portion of the first band of light is coupled out of said first light emitting panel linearly increases as a function of the distance between said light transmitting edge area and said first sub-surface.

4. The illumination system of claim 1, wherein the degree in which the at least a portion of the first band of light is coupled out of said first light emitting panel decreases as a function of the distance between said light transmitting edge area and said first sub-surface.

5. The illumination system of claim 1, wherein the degree in which the at least a portion of the first band of light is, coupled out of said first light emitting panel linearly decreases as a function of the distance between said light transmitting edge area and said first sub-surface.

6. The illumination system of claim 1,
   wherein a degree in which the at least a portion of the second band of light is coupled out of said second light emitting panel varies as a function of a distance between said second light transmitting edge area and said second sub-surface.

7. The illumination system of claim 6,
wherein said first sub-surface is further operable to project the at least portion of the first band of light on a first projected region; and
wherein said second sub-surface is further operable to project the at least portion of the second band of light on a second projected region.

8. The illumination system of claim 7, wherein at least a portion of the first projected region and at least a portion of the second projected region overlap.

9. The illumination system of claim 7,
wherein a projection area includes the first projection region and the second projected region; and
wherein a length of said first light emitting panel is less than a length of the projection area.

10. The illumination system of claims 1,
wherein a projection area includes a plurality of projected regions;
wherein said first sub-surface is further operable to project the at least portion of the first band of light on a first projected region of the plurality of projected regions; and
wherein a length of said first light emitting panel is less than a length of the projection area.

11. The illumination system of claim 1, further comprising:
a sensor operable to measure an optical property of the first band of light,
wherein said fight light source emits the first band of light as a function of the measured optical property of the first band of light.

12. An illumination system for illuminating a display device, said illumination system comprising:
a first light source operable to emit a first band of light;
a first light emitting panel including a first light transmitting edge area operable to receive the first band of light, said first light emitting panel further including a first sub-surface on a first wall, said first sub-surface operable to couple it least a portion of the first band of light out of said first light emitting panel,
wherein a projection area includes a plurality of projected regions,
wherein said first sub-surface is further operable to project the at least portion of the first band of light on a first projected region of the plurality of projected regions, and
wherein a length of said first light emitting panel is less than a length of the projection area;
a second light source operable to emit a second band of light; and
a second light emitting panel including a second light transmitting edge area operable to receive the second band of light, said second light emitting panel further including a second sub-surface on a second wall, said second sub-surface operable to couple at least a portion of the second band of light out of said second light emitting panel,
wherein said second sub-surface is further operable to project the at least portion of the second band of light on a second projected region of the plurality of projected regions.

13. The illumination system of claim 12,
wherein a length of said second light emitting panel is less than the length of the projection area.

14. The illumination system of claim 13, wherein at least a portion of the first projected region and at least a portion of the second projected region overlap.

15. The illumination system of claim 12,
wherein a length of said second light emitting panel equals the length of the projection area.

16. The illumination system of claim 15, wherein at least a portion of the first projected region and at least a portion of the second projected region overlap.

17. The illumination system of claim 12, further comprising:
a sensor operable to measure an optical property of the first band of light,
wherein said fight light source emits the first band of light as a function of the measured optical property of the first band of light.

18. An illumination system for illuminating a display device, said illumination system comprising:
a first light source operable to emit a first band of light;
a first light emitting panel including a first light transmitting edge area operable to receive the first band of light, said first light emitting panel further including a first sub-surface on a first wall, said first sub-surface operable to couple at least a portion of the first band of light out of said first light emitting panel; and
a first sensor operable to measure an optical property of the first band of light,
wherein said fight light source emits the first band of light as a function of the measured optical property of the first band of light.

19. The illumination system of claim 18, further comprising:
a second light source operable to emit a second band of light;
a second light emitting panel including a second light transmitting edge area operable to receive the second band of light, said second light emitting panel further including a second sub-surface on a second wall, said second sur-surface operable to couple at least a portion of the second band of light out of said second light emitting panel; and
a second sensor operable to measure an optical property of the second band of light,
wherein said second light source emits the second band of light as a function of the measured optical property of the second band of light.

20. The illumination system of claim 19, further comprising:
a third source operable to emit a third band of light;
a third light emitting panel including a third light transmitting edge area operable to receive the third band of light, said third light emitting panel further including a third sub-surface on a third wall, said third sub-surface operable to couple at least a portion of the third band of light out of said third light emitting panel; and
a third sensor operable to measure an optical property of the third band of light,
wherein said third light source emits the third band of light as a function of optical property of the third band of light.

* * * * *